April 28, 1931. J. F. PRITCHARD 1,803,036
REDISTRIBUTION SYSTEM FOR COOLING TOWERS
Filed Aug. 25, 1927
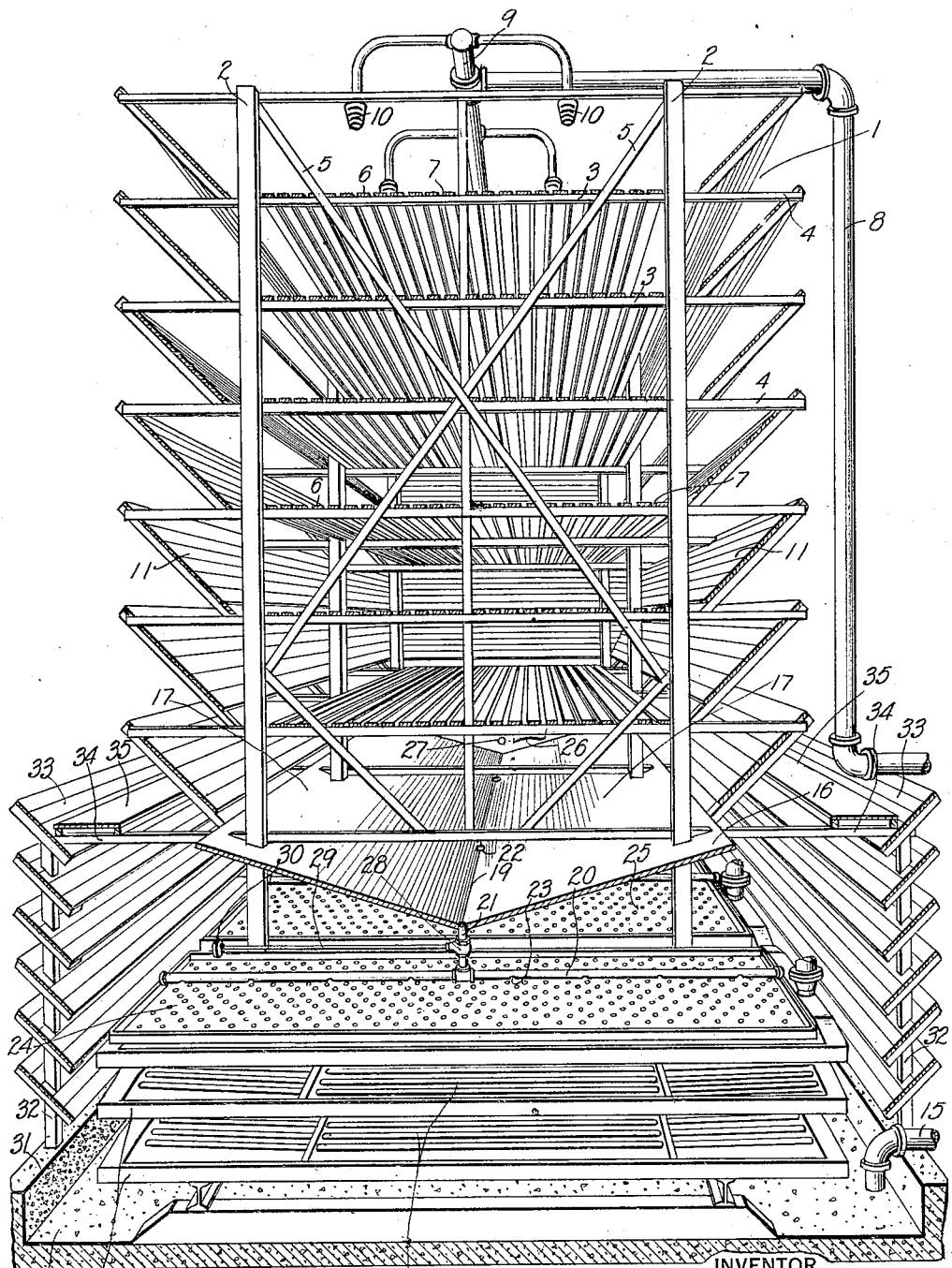
INVENTOR
John F. Pritchard
BY
ATTORNEY Patented Apr. 28, 1931

1,803,036

UNITED STATES PATENT OFFICE

JOHN F. PRITCHARD, OF KANSAS CITY, MISSOURI

REDISTRIBUTION SYSTEM FOR COOLING TOWERS

Application filed August 25, 1927. Serial No. 215,420.

My invention relates to cooling towers and more particularly to means for redistributing water from the cooling tower to apparatus to be cooled, the object being to collect the sprayed water that may be wind-blown in its gravity passage through the tower and distribute the same evenly over the several pieces of apparatus to be cooled.

In accomplishing this object I have provided improved details of structure, the preferred forms of which are illustrated in the accompanying drawings, wherein:

The figure represents the combination of a cooling tower with apparatus to be cooled, with which my device is associated.

Referring in detail to the drawings:

1 designates a cooling tower comprising posts 2 supporting struts 3, having ends 4 extending beyond the posts, ties 5 bracing the structure, and slats 6 disposed longitudinally of the tower on the struts and between the posts to form decks 7. Water, which is assumed to be hot and for cooling, is delivered to the tower through a supply pipe 8 to a longitudinal distributor pipe 9, from which it is spread over the tower through the sprinklers 10.

The cooling tower is of the atmospheric type, erected out of doors to receive the normal air currents for cooling the water that passes downwardly from the sprinklers over and through the decks; and to prevent the blowing away of the spray that is finely divided, slatted louvers 11 are installed longitudinally on each side of the tower supported by the laterally extending ends of the struts and by positioning on the strut ends adjacent the posts.

A cooling tower is frequently elevated so that the apparatus to be cooled may be positioned beneath it in such position that the water passing downwardly in the tower may fall directly upon the apparatus and obviate the necessity for pumping the water from the tower to the apparatus. For my purpose, as for usual practice in combining a tower with apparatus to be cooled, apparatus such as stacks 12 of cooling coils 13 are arranged under the raised tower and on the floor of a basin 14 in which the water cooled by the tower is ordinarily collected. A pipe 15 may conduct water heated by passage over the coils from the basin to a pump (not shown) which lifts water to the distributor pipe on the tower.

A difficulty arising in the operation of a combination such as described consists in the blowing of the sprayed water to one part or another of the tower so that portions of the cooling coils receive adequate or excessive amounts of the cooled water while other portions may receive none. The louvers serve to break the wind and to prevent a high wind from blowing the descending water entirely from the tower and away from the cooling coils but the louvers or other baffle elements must be, for practical reasons, limited in their wind-breaking function, since the purpose of the tower is to permit the passage therethrough of air to cool the sprayed water. Means previously provided in the art tend to lose their ability to distribute water evenly, by warping or under effects of wind.

I provide, therefore, to overcome the problem of permitting adequate supply of air to reach the water while providing for the delivery of the water to the cooling coils and to assure an even redistribution, a redistributing device to be installed between the lower deck of the tower and the cooling coils. For my purpose the tower may be erected on longer posts than normally although ordinarily there will be sufficient room between the lower deck of the tower and the apparatus to be cooled to admit the relatively shallow elements of my device.

The invention comprises a collector 16 consisting of a basin or trough having slanting walls 17 and 18, arranged longitudinally of the tower, the median line of the trough sump 19 being preferably in the longitudinal median line of the tower; closed end cross pipes 20 arranged transversely of the trough and communicating therewith through vertical pipes 21 installed in openings 22 of the trough sump, the cross pipes having lower spaced openings 23; and spreading means consisting preferably of distributing pans 24 having perforate bottoms 25 positioned beneath the cross pipes and immediately above the apparatus to be cooled to receive water from the cross pipes. The trough has end walls such as 26, provided with overflow means illustrated as openings 27 provided in the end walls.

The longitudinal outer edges of the trough extend laterally beyond the longitudinally aligned supporting posts and are supported by said posts and by the struts, whereby the finely divided water falling through the tower, even when violently wind-blown, may be collected by the louvers and delivered to the trough. One of said openings 22 is preferably provided in the trough centrally above each of the pieces of cooling apparatus, in this case above each of the stacks of cooling coil sections, so that the wind-blown water received by the trough and flowing down a sloping side wall 17 or 18 for storage in the sump will be relatively evenly distributed to the several openings 22 for relatively even distribution to the several distributing cross pipes and spreading means.

When air currents are such that water tends to be blown towards one end of the tower and trough, the distribution continues relatively even through the openings 22 since a substantial volume of water is ordinarily present in the sump of the trough and equal amounts are, therefore, available for passage through all of the openings. Further, the openings 23 in the cross pipes 20 are provided of such dimensions that the cross pipes tend to distribute the water evenly throughout their length.

I have provided further, however, means for assuring the even distribution of water to the distributing pan comprising valves 28, positioned in the vertical communicating pipes 21 and having elongated stems 29 provided with handles 30 arranged adjacent the sides of the device for convenient access, whereby the amounts of water flowing from the trough into the cross pipes may be regulated in accordance with the supply of water being delivered to the trough through the tower.

Erected preferably on the side walls 31 of the basin 14 are posts 32 on which louvers 33 are supported to provide wind break structures of ordinary construction, braced by struts 34 on which walk-ways 35 are positioned for convenient access to the tower and trough.

In operating the device constructed as described in association with a cooling tower and apparatus to be cooled, the water to be cooled is delivered from the supply pipe and sprinklers to the upper deck of the tower and drips between the slats to the lower decks and through them to the trough, any excessive air blowing the spray against the louvers to be collected largely thereby and turned inwardly toward the tower to be received by the trough. A high wind that may blow the water to one side of the tower throughout its height and deliver it, for example, altogether to one side of the trough, will not interfere with the efficient cooling of the entire surface of the cooling coils since the water collected by the trough will be delivered in equal parts to all of the openings in the bottom of the trough and will be delivered in desired and appropriate amounts proportionate to the number of gallons per minute being supplied to the distributing cross pipes.

Each of the cross pipes will deliver its own supply as received equally to all portions of the perforated distributing pan with which the cross pipe is related so that each of the pans may distribute evenly to the cooling coil stack which it serves a finely divided shower of cooling water that reaches each part of the stack.

My provision of a distributing pan for each stack, and a cross pipe to serve each pan, is particularly pointed out, since the division into the plurality of parts obviates the hazard of unequal distribution over a single pan or distributing member that may become warped and so deprive a portion of the apparatus to be cooled of its share of the water.

The regulating valve in the communicating pipes between the trough and the cross pipes is also pointed out as an additional safeguard for use under adverse conditions when a relatively small quantity of water being delivered through the tower might be completely drained away through the opening and the cross pipe so that in case of heavy wind the delivery of the main portion of the water to one section of the trough would cause the water to flow out entirely through one or more openings, other openings receiving no water. The valves may be operated to reduce the effective areas thereof to limit the out-flow and so restrain water to provide a desired level thereof in the sump to be distributed to all of the openings equally and evenly.

The closed method I disclose for dispensing the water from my collecting element, through openings in the bottom of a trough sump, overcomes a serious problem in the industry, namely, the accidental departure of elements of an overflow system from level position, or distortion of distributing elements by warping which causes one part to rise above a normal water overflow level and thus be unable to distribute water to the portion of apparatus which it was designed to serve. My method, providing for movement of the water from the collector through bottom holes into pipes, obviates any interference with equal distribution even if the trough should become warped. My use of metallic pipes, the cross pipes to receive water from the collector and redistribute it to the coils, avoids the hazard of unequal distribution that might occur in the use of wooden overflow cross members.

A further advantage of the closed method that I disclose, consists in the protection of the redistributing member from air currents which would tend to blow water in overflow elements to one side thereof and deprive the sides or ends of overflow distributing ability. The trough of my device has sides extending upwardly substantially above the normal level of water in the sump shielding the water from air currents; and the cross pipes obviously protect from wind the water therein.

The provision of elements producing a closed system of redistribution, enables me to control and regulate the volume of water being distributed, either to adjust it to the amount being received, or for other purposes; which is not feasible in an open trough system.

I have illustrated the spreading means as distributing pans supported by the apparatus to be cooled, although the pans may be suspended from the tower structure or from the louvers or otherwise related to the cross pipes and the apparatus to be cooled. The spreading means may consist of splash plates supported below the cross pipe openings.

It is pointed out, therefore, that my apparatus provides for the collection of substantially all the water passing downwardly through a cooling tower in a basin having sloping walls, the passage of the collected water evenly through regulated openings and the transversely disposed pipes for even distribution in relatively small jets over the entire width of the tower and of the apparatus to be cooled, and the further collection and distribution of the water by pans disposed in close relation to the apparatus to be cooled.

What I claim and desire to secure by Letters Patent is:

1. In a cooling tower including spaced decks in its upper portion and a coil in its lower portion, a trough extended through the tower between the coil and decks for collecting cooled liquid from the lower deck, a pipe extended over the coil beneath the trough connected with the trough to receive liquid therefrom and having spaced ports for distributing said liquid, and a pan beneath the pipe covering the coil and having a multiplicity of apertures in its bottom for spreading liquid received from the pipe over the coils.

2. In a cooling tower including a vertical series of spaced decks in its upper portion and a horizontal series of spaced coils in its lower portion, a substantially V-shaped trough of substantially the width of the tower interposed between the coils and lower deck, a pipe over each coil connected with the trough and having spaced ports for distributing liquid received from the trough above the coils, and a pan over each coil beneath a corresponding distributing pipe having a multiplicity of perforations for spreading liquid received from the pipe over the coil.

3. In a cooling tower including spaced decks in its upper portion and a coil in its lower portion, a trough extended through the tower between the coil and decks for collecting cooled liquid from the lower deck, a pipe extended over the coil beneath the trough connected with the trough to receive liquid therefrom and having spaced ports for distributing said liquid, and means beneath the pipe for spreading liquid received from the pipes over the coil, said trough having walls slanting oppositely upwardly from the median line of the tower.

4. In a cooling tower including a deck in its upper portion and a coil in its lower portion, a substantially V-shaped trough of substantially the width of the tower interposed between the coil and the deck and having its median line in the longitudinal median line of the tower, a pipe over the coil connected with the trough and having ports for distributing liquid received from the trough above the coils, and means over the coil beneath the pipe in receiving relation with said ports for spreading liquid received from the pipe over the coil.

In testimony whereof I affix my signature.

JOHN F. PRITCHARD.